(12) United States Patent
Hayashi et al.

(10) Patent No.: US 10,000,182 B2
(45) Date of Patent: Jun. 19, 2018

(54) BUCKLE DEVICE

(71) Applicant: KABUSHIKI KAISHA TOKAI-RIKA-DENKI-SEISAKUSHO, Aichi-ken (JP)

(72) Inventors: Koji Hayashi, Aichi-ken (JP); Makoto Matsuzaki, Aichi-ken (JP)

(73) Assignee: KABUSHIKI KAISHA TOKAI-RIKA-DENKI-SEISAKUSHO, Aichi-Ken (JP)

( * ) Notice: Subject to any disclaimer, the term of this patent is extended or adjusted under 35 U.S.C. 154(b) by 0 days. days.

(21) Appl. No.: 15/426,707

(22) Filed: Feb. 7, 2017

(65) Prior Publication Data

US 2017/0225645 A1 Aug. 10, 2017

(30) Foreign Application Priority Data

Feb. 10, 2016 (JP) ................................. 2016-023929

(51) Int. Cl.
  *B60R 22/20* (2006.01)
  *B60R 22/26* (2006.01)
  *B60R 22/48* (2006.01)
  *B60R 22/195* (2006.01)
  *B60R 22/18* (2006.01)

(52) U.S. Cl.
  CPC .......... *B60R 22/20* (2013.01); *B60R 22/1952* (2013.01); *B60R 22/26* (2013.01);
  (Continued)

(58) Field of Classification Search
  CPC ..... B60R 22/20; B60R 22/1952; B60R 22/48; B60R 22/26; B60R 2022/1957;
  (Continued)

(56) References Cited

U.S. PATENT DOCUMENTS 5,098,162 A * 3/1992 Forget ..................... B60R 22/22
                                                          297/482
5,568,940 A * 10/1996 Lane, Jr. ............. B60R 22/1952
                                                          180/268
(Continued)

FOREIGN PATENT DOCUMENTS

JP    S60-191563      12/1985
JP    H04-353054 A    12/1992
(Continued)

OTHER PUBLICATIONS

Notification of Reasons for rejection issued in the corresponding Japanese Application No. 2016-023929 dated Mar. 7, 2017.
(Continued)

*Primary Examiner* — Darlene P Condra
(74) *Attorney, Agent, or Firm* — Roberts Mlotkowski Safran Cole & Calderon P.C.

(57) ABSTRACT

In a buckle device, displacement of a buckle cover in a width direction with respect to a buckle guide is restricted by restricting grooves of the buckle cover and restricting ribs of the buckle guide that enter the restricting grooves. This enables a space to be secured between a wall portion on one side in a width direction of the buckle cover and a wall portion on one side in a width direction of the buckle guide.

13 Claims, 3 Drawing Sheets

(52) U.S. Cl.
CPC ...... B60R 22/48 (2013.01); *B60R 2022/1806* (2013.01); *B60R 2022/1812* (2013.01); *B60R 2022/1831* (2013.01); *B60R 2022/1957* (2013.01)

(58) Field of Classification Search
CPC .... B60R 2022/1831; B60R 2022/1812; B60R 2022/1806
See application file for complete search history.

(56) References Cited

U.S. PATENT DOCUMENTS 5,671,949 A * 9/1997 Bauer ................ B60R 22/1952
280/806

2002/0180200 A1* 12/2002 Tokugawa .............. B60R 22/48
280/801.1
2007/0013184 A1* 1/2007 Gomi ..................... B60R 22/18
280/801.1

FOREIGN PATENT DOCUMENTS

| JP | 2007-022227 | 2/2007 |
| JP | 2010-208497 | 9/2010 |
| JP | 2014-172487 | 9/2014 |

OTHER PUBLICATIONS

Notification of Reasons for rejection, JP Application No. 2016-023929 dated Nov. 1, 2016.

* cited by examiner

BUCKLE DEVICE

CROSS-REFERENCE TO RELATED APPLICATION

This application claims priority under 35 USC 119 from Japanese Patent Application No. 2016-023929, filed Feb. 10, 2016, the disclosure of which is incorporated by reference herein.

BACKGROUND

Field of the Invention

The present invention relates to a buckle device capable of moving a buckle.

Related Art

There are buckle devices in which a buckle is moved by drive force of a drive section (see, for example, Japanese Patent Application Laid-Open (JP-A) No. 2010-208497).

In order to stabilize movement direction of the buckle in such buckle devices, for example, it would be conceivable to employ an extending and contracting member in which an inner side member is provided at the inside of a tube shaped outer side member, and that is moved by one of the inner side member or the outer side member guiding the other of the inner side member or the outer side member. However, in such extending and contracting member, supposing that the one of the inner side member or the outer side member were configured to be guided and moved by the other of the inner side member or the outer side member by fitting together an outer face of the inner side member with an inner face of the outer side member, a space could not be provided between the outer side member and the inner side member.

SUMMARY

In consideration of the above circumstances, a buckle device capable of securing a space between an outer side member and an inner side member of an extending and contracting member is obtained.

A buckle device of a first aspect includes: a buckle that is configured to engage with a tongue of a seatbelt device; an extending and contracting member in which an inner side member is provided at inside of a tube shaped outer side member, the buckle being provided at one of the outer side member or the inner side member, the extending and contracting member being extended and contracted due to the one of the outer side member or the inner side member being moved with respect to another of the outer side member or the inner side member; and a restricting section that restricts relative displacement of the inner side member with respect to the outer side member in a direction in which a space between the inner side member and the outer side member becomes smaller.

In the buckle device of the first aspect, relative displacement of the inner side member and the outer side member in the direction in which the space between the inner side member and the outer side member of the extending and contracting member narrows (becomes smaller) is restricted by the restricting section, thereby enabling the space (space portion) between the outer side member and the inner side member to be secured.

A buckle device of a second aspect is the buckle device of the first aspect, wherein the restricting section guides the one of the outer side member or the inner side member in a movement direction of the one of the outer side member or the inner side member.

In the buckle device of the second aspect, the one of the outer side member or the inner side member is guided by the restricting section, thereby enabling the one of the outer side member or the inner side member to be moved in the movement direction with respect to the other of the outer side member or the inner side member.

A buckle device of a third aspect is the buckle device of the first aspect or the second aspect, further including a moving member that is disposed inside the space, that is connected to the buckle or to the one of the outer side member or the inner side member, and that has at least a portion that is moved together with the buckle or the one of the outer side member or the inner side member.

In the buckle device of the third aspect, the moving member that is connected (linked) to the one of the outer side member or the inner side member (or the buckle) is disposed inside the space between the inner side member and the outer side member. This enables the moving member, that is close to (near) the one of the outer side member or the inner side member, to be disposed along the one of the outer side member or the inner side member.

A buckle device of a fourth aspect is the buckle device of the third aspect, further including: a coupling member that has one side coupled to the buckle or to the one of the outer side member or the inner side member; and a driving section to which another side of the coupling member is coupled, that moves the coupling member by outputting drive force, and that moves, together with the coupling member, the one of the outer side member or the inner side member with respect to the other of the outer side member or the inner side member, wherein the moving member is configured to extend and contract toward a movement direction side of the one of the outer side member or the inner side member due to movement of the one of the outer side member or the inner side member.

In the buckle device of the fourth aspect, the moving member is capable of extending and contracting toward the movement direction side of the one of the outer side member or the inner side member due to movement of the one of the outer side member or the inner side member. This enables, when the moving member is moved together with the one of the outer side member or the inner side member, the moving member to be suppressed from contacting the coupling member.

A buckle device of a fifth aspect is the buckle device of any one of the first aspect to the fourth aspect, further including a bend inducing portion that is provided at the other of the outer side member or the inner side member, and that induces bending deformation of the other of the outer side member or the inner side member due to the other of the outer side member or the inner side member receiving load in a direction intersecting a movement direction of the one of the outer side member or the inner side member, wherein rigidity, with respect to the load, of a portion of the other of the outer side member or the inner side member, the portion being further toward a buckle side than the bend inducing portion, is enhanced by the restricting section.

In the buckle device of the fifth aspect, the rigidity of the buckle side portion of the other of the outer side member or the inner side member is enhanced (reinforced) by the restricting section. Thus, when the load in the direction intersecting the movement direction of the one of the outer side member or the inner side member with respect to the other of the outer side member or the inner side member is applied to the other of the outer side member or the inner side member, deformation is made occurred in the other of the outer side member or the inner side member at the bend inducing portion, and deformation at the portion further toward the buckle side than the bend inducing portion at the other of the outer side member or the inner side member, can be suppressed.

In the aspects, it is possible that the restricting section is provided at at least the another of the outer side member or the inner side member, the restricting section restricting relative displacement of the inner side member with respect to the outer side member in the direction in which the space between the inner side member and the outer side member becomes smaller by being abutted to the one of the outer side member or the inner side member; and the restricting section guides the one of the outer side member or the inner side member in a movement direction of the one of the outer side member or the inner side member.

Further in the aspects, it is possible that the restricting section enhances rigidity of the another of the outer side member or the inner side member.

Further in the aspects, it is possible that the restricting section includes a restricting groove formed at the one of the outer side member or the inner side member, the restricting section of the another of the outer side member or the inner side member enters inside the restricting groove, by the restricting section of the another of the outer side member or the inner side member abutting the restricting groove, relative displacement of the one of the outer side member or the inner side member with respect to the another of the outer side member or the inner side member is restricted in a direction intersecting a moving direction of the one of the outer side member or the inner side member with respect to the another of the outer side member or the inner side member, and due to the restricting section of the another of the outer side member or the inner side member, which enters the inside, the one of the outer side member or the inner side member is guided in the moving direction of the one of the outer side member or the inner side member with respect to the another of the outer side member or the inner side member.

The buckle device of the aspects is capable of securing a space between an outer side member and an inner side member of an extending and contracting member.

BRIEF DESCRIPTION OF THE DRAWINGS

An exemplary embodiment will be described in detail based on the following figures, wherein.

DETAILED DESCRIPTION

Explanation follows regarding an exemplary embodiment, based on FIG. 1 to FIG. 4. Note that in each of the drawings, the arrow FR indicates the vehicle front side, the arrow OUT indicates the vehicle width direction outside, and the arrow UP indicates the vehicle upper side of a location where a buckle device 10 is applied.

Configuration of Present Exemplary Embodiment

Figure 1:
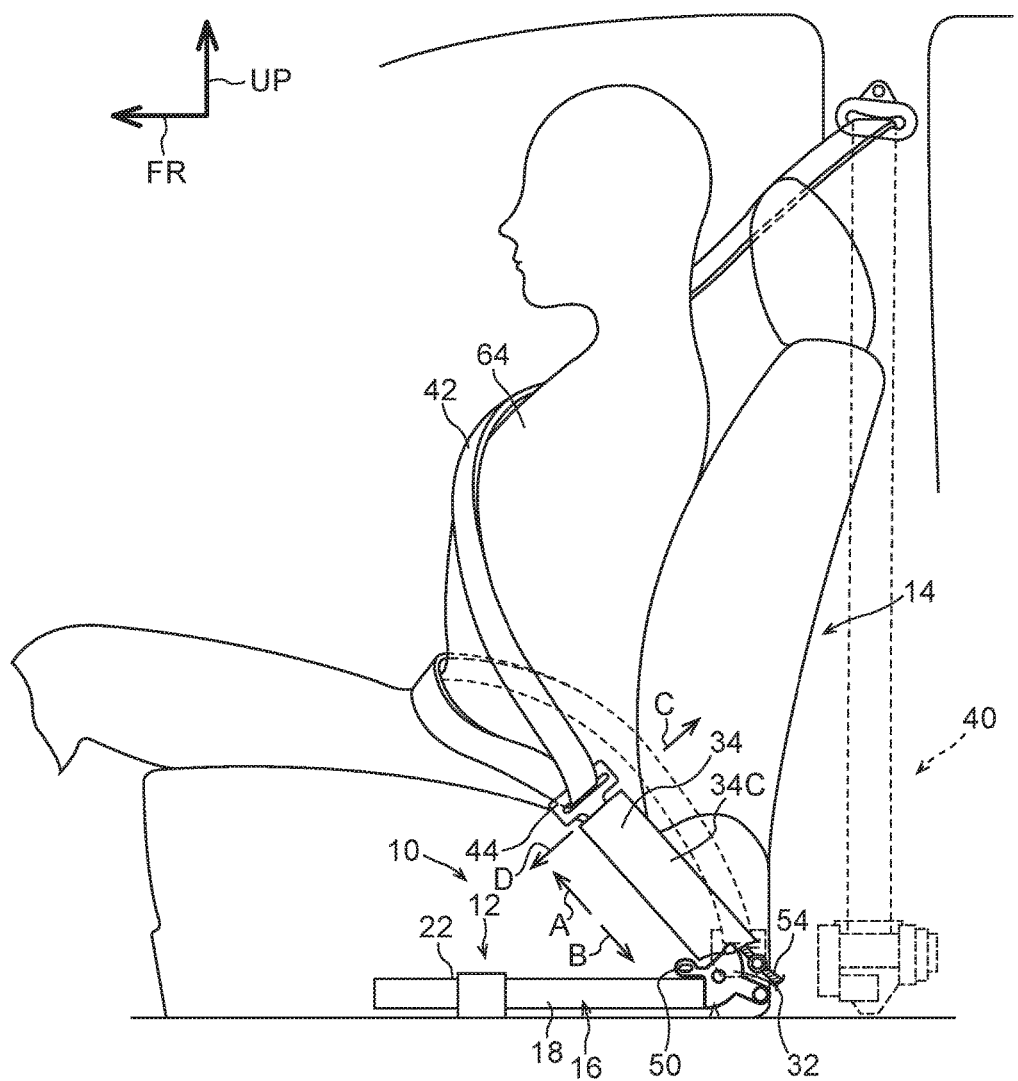
FIG. 1 is a side view of a seat applied with a buckle device according to an exemplary embodiment, as viewed from the vehicle width direction inside.
Figure 2:
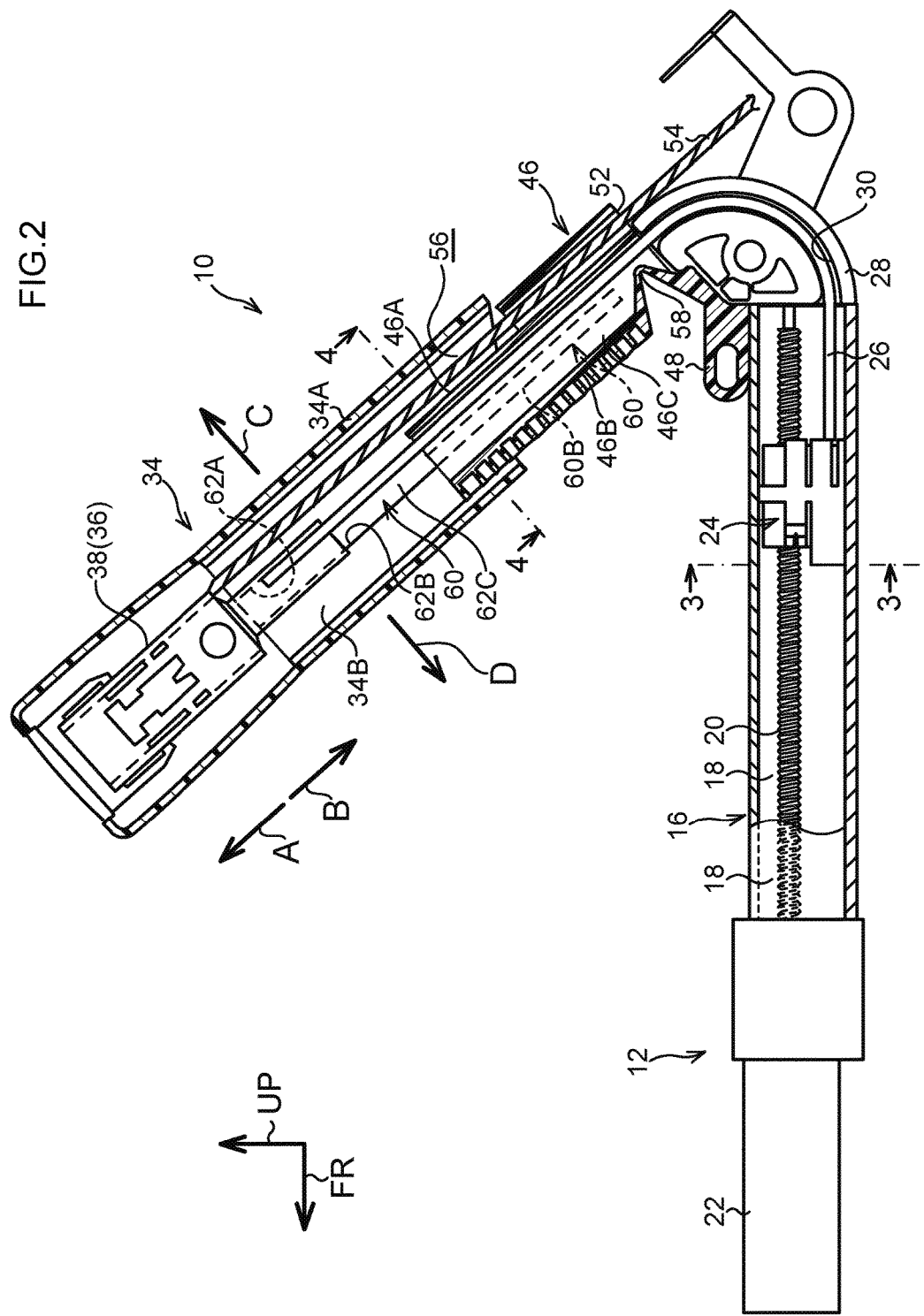
FIG. 2 is a side cross-section of a buckle device according to an exemplary embodiment, with a cover plate removed.
Figure 3:
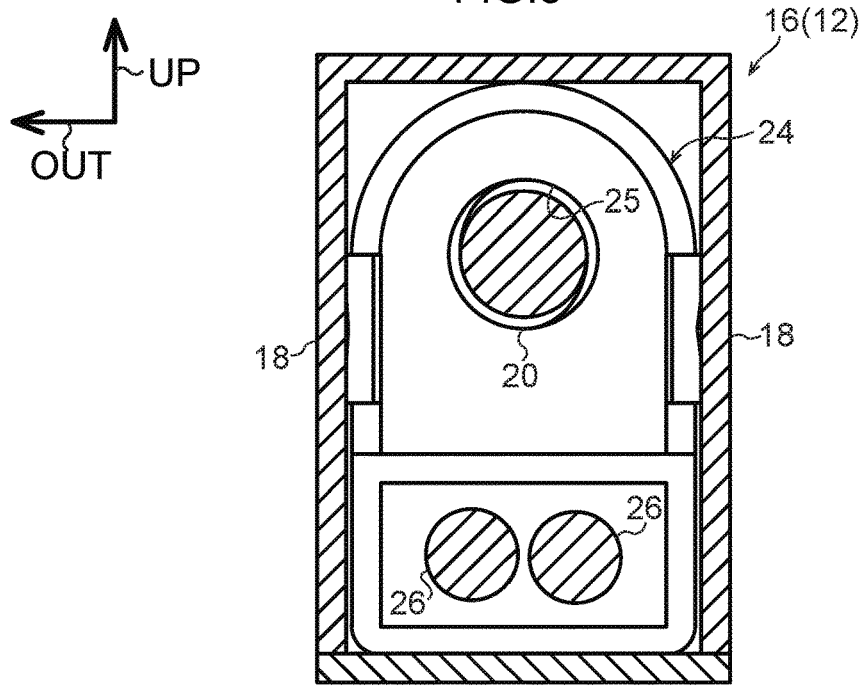
FIG. 3 is a cross-section taken along line 3-3 in FIG. 2.

As illustrated in FIG. 1, the buckle device 10 includes a buckle drive device 12 serving as a drive section. The buckle drive device 12 is provided at the vehicle width direction inside of a seat 14 applied with the buckle device 10. The buckle drive device 12 includes a frame 16 serving as a slider guiding mechanism. The frame 16 is fixed to the vehicle body side, such as a floor section of the vehicle body of the vehicle, by a fastener such as a bolt. As illustrated in FIG. 2 and FIG. 3, the frame 16 includes a pair of guide walls 18 that face each other in the vehicle width direction and serve as slider guiding section. A drive screw 20 serving as a drive section is provided between the guide walls 18. The central axial direction of the drive screw 20 extends along the vehicle front-rear direction, and the drive screw 20 is capable of rotating about its central axis.

As illustrated in FIG. 2, a motor actuator 22 serving as a drive force output section is provided at the vehicle front side of the frame 16. A vehicle front side end portion of the drive screw 20 is coupled to the motor actuator 22, and the drive screw 20 is rotated about the central axis of the drive screw 20 by drive force output from a motor of the motor actuator 22. The motor of the motor actuator 22 is electrically connected to a controller (not illustrated in the drawings) such as a motor driver and an ECU, and the motor of the motor actuator 22 is controlled by the controller.

As illustrated in FIG. 3, a slider 24 is provided between the guide walls 18 of the frame 16. Vehicle width direction side faces of the slider 24 abut the guide walls 18 of the frame 16. A thread hole 25 which the drive screw 20 pierces through is formed in the slider 24. The slider 24 is guided by the guide walls 18 so as to slide along the vehicle front-rear direction due to the drive screw 20 rotating.

As illustrated in FIG. 2 and FIG. 3, the buckle device 10 includes two wire ropes 26 serving as coupling member. The wire ropes 26 are each formed in an elongated shape, and, as illustrated in FIG. 3, are provided so as to be arranged side by side in the vehicle width direction (the width direction of the seat 14). As illustrated in FIG. 2, at the side of the wire ropes 26 that is further toward respective length direction base ends than length direction intermediate portions thereof, the length direction of the wire ropes 26 runs along the vehicle front-rear direction, and respective length direction base end portions of the wire ropes 26 are coupled to the slider 24 at a location further toward the vehicle lower side than the drive screw 20. Thus, the wire ropes 26 are moved along their length direction when the slider 24 slides along the vehicle front-rear direction.

As illustrated in FIG. 2, a wire guide 28 is provided at the vehicle rear side of the frame 16. A wire guide groove 30 serving as a groove portion is formed in the wire guide 28. The wire guide groove 30 is open at a vehicle width direction inside face of the wire guide 28. A cover plate 32 (see FIG. 1) is provided at the vehicle width direction inside of the wire guide 28, and the wire guide groove 30 of the wire guide 28 is closed off from the vehicle width direction inside by the cover plate 32.

One length direction end of the wire guide groove 30 is open at a vehicle front side face of the wire guide 28, a length direction intermediate portion of the wire guide groove 30 is curved about an axial direction, the axial direction being along the vehicle width direction, and another length direction end of the wire guide groove 30 is open at a vehicle upper side face of the wire guide 28. The wire ropes 26 are passed through the wire guide groove 30, and the wire ropes 26 are bent (curved) about the axial direction, the axial direction being along the vehicle width direction (the width direction of the seat 14) so as to follow the wire guide groove 30 of the wire guide 28. A length direction leading end side of the wire ropes 26 extends further diagonally toward the vehicle upper front side (the arrow A direction in FIG. 2) than the opening in the vehicle upper side face of the wire guide 28.

Figure 4:
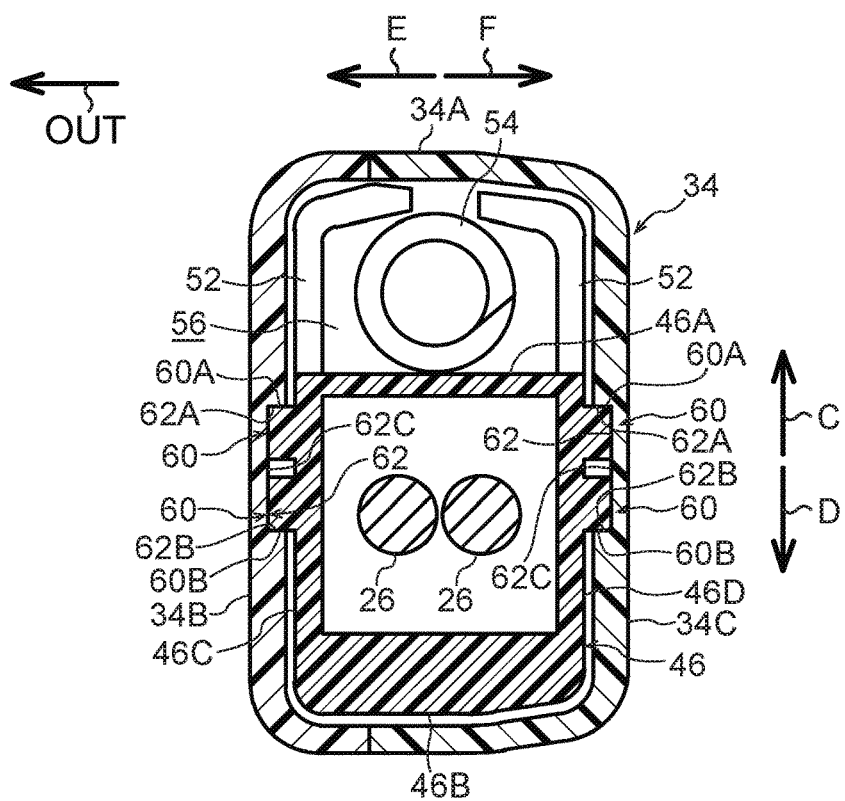
FIG. 4 is a cross-section taken along line 4-4 in FIG. 2.

As illustrated in FIG. 1 and FIG. 2, the buckle device 10 includes a buckle cover 34 configuring an extending and contracting member and serving as an outer side member. As illustrated in FIG. 4, the buckle cover 34 is formed in a tube shape. As illustrated in FIG. 2, both length direction ends of the buckle cover 34 are open. The length direction of the buckle cover 34 runs along a direction (the arrow A direction and arrow B direction in FIG. 2) that is sloped in the vehicle front-rear direction with respect to the vehicle up-down direction. As illustrated in FIG. 4, a cross-section profile of the buckle cover 34 sectioned in a direction orthogonal to the length direction of the buckle cover 34 has a substantially rectangular shape, and the thickness direction of the buckle cover 34 is substantially in the vehicle width direction. As illustrated in FIG. 2, a buckle 36 is provided in a vehicle upper side portion inside the buckle cover 34.

The buckle 36 includes a buckle body 38. The buckle body 38 is formed with a U-shaped cross-section profile open toward the vehicle width direction outside. Configuration components (not illustrated in the drawings) of the buckle 36, such as a latch, are provided inside the buckle body 38. When a tongue 44 provided at webbing 42 of a seatbelt device 40 illustrated in FIG. 1 is inserted diagonally into the inside of the buckle body 38 from the vehicle upper front side of the buckle body 38, the latch provided at the buckle body 38 enters a hole portion formed in the tongue 44, and the tongue 44 engages with the buckle 36 accordingly.

As illustrated in FIG. 2, the buckle device 10 also includes a buckle guide 46 configuring the extending and contracting member, and serving as an inner side member. The buckle guide 46 is formed in a tube shape using a softer synthetic resin material than the buckle cover 34, and both length direction ends of the buckle guide 46 are open. The length direction of the buckle guide 46 runs along the length direction of the buckle cover 34 (the arrow A direction and arrow B direction in FIG. 2). As illustrated in FIG. 4, a cross-section profile of the buckle guide 46 sectioned in a direction orthogonal to the length direction of the buckle guide 46 has a substantially rectangular shape, and the thickness direction of the buckle guide 46 is substantially in the vehicle width direction. The buckle guide 46 is diagonally inserted into the inside of the buckle cover 34 from the vehicle lower rear side of the buckle cover 34.

A buckle guide-side coupling section 48 is formed to an end portion on another length direction side (the arrow B direction side in FIG. 2) of the buckle guide 46. A cover plate-side coupling section 50 of the cover plate 32 illustrated in FIG. 1 is disposed at the vehicle width direction inside of the buckle guide-side coupling section 48. The buckle guide-side coupling section 48 of the buckle guide 46 and the cover plate-side coupling section 50 of the cover plate 32 are coupled together.

The wire ropes 26 pass through inside the buckle guide 46. The length direction leading end side of the wire ropes 26 extends from an end portion on one length direction side (the arrow A direction side in FIG. 2) of the buckle guide 46 toward the outside of the buckle guide 46, and is coupled to the buckle body 38 provided at the buckle cover 34. When length direction leading end portions of the wire ropes 26 are moved diagonally toward the vehicle upper front side (the arrow A direction side in FIG. 2) due to the wire ropes 26 being moved toward their length direction leading end side, the buckle 36 is moved diagonally toward the vehicle upper front side accompanying the buckle cover 34. In contrast thereto, when the length direction leading end portions of the wire ropes 26 are moved diagonally toward the vehicle lower rear side (the arrow B direction side in FIG. 2) due to the wire ropes 26 being moved toward their length direction base end side, the buckle 36 is moved diagonally toward the vehicle lower rear side accompanying the buckle cover 34.

As illustrated in FIG. 2 and FIG. 4, outer walls 52 are provided at a portion of the buckle guide 46 that is further toward the another length direction side (the arrow B direction side in FIG. 2) than a length direction intermediate portion thereof. The outer walls 52 respectively extend out toward one width direction side of the buckle guide 46 from both thickness direction ends of the of the buckle guide 46 at an end on the one width direction side (the arrow C direction side in FIG. 2 and FIG. 4) of the buckle guide 46. A curled cord 54 serving as a moving member is provided between the outer walls 52. The curled cord 54 is formed in an elongated shape in which at least one of a power wire and/or a signal wire is covered by a synthetic resin material. The curled cord 54 is formed in a spiral shape, and is capable of extending and contracting along its length direction.

As illustrated in FIG. 2, a space portion 56 is set further toward the one length direction side of the buckle guide 46 than the outer walls 52. The space 56 is configured between a wall portion 46A on the one width direction side (the arrow C direction side in FIG. 2) of the buckle guide 46 and a wall portion 34A on the one width direction side of the buckle cover 34. A length direction leading end side of the curled cord 54, which extends further toward the one length direction side of the buckle cover 34 than between the outer walls 52 of the buckle guide 46, passes through the space 56 and is connected to a buckle switch (not illustrated in the drawings) of the buckle 36.

Thus, when the buckle cover 34 is moved along the length direction of the buckle cover 34 and the buckle guide 46 with respect to the buckle guide 46, a length direction leading end portion of the curled cord 54 is moved together with the buckle cover 34, and the curled cord 54 extends or contracts accordingly. A length direction base end side of the curled cord 54 extends from a vehicle lower side end portion of the buckle guide 46 toward the outside of the buckle guide 46. The length direction base end side of the curled cord 54 is directly or indirectly connected to a battery (not illustrated in the drawings) installed in the vehicle if the curled cord 54 includes a power wire, and/or is directly or indirectly connected to the controller installed in the vehicle if the curled cord 54 includes a signal wire.

A bend inducing portion 58 is formed in the buckle guide 46, at further toward the vehicle upper side than the buckle guide-side coupling section 48. Width direction (the arrow C direction and arrow D direction in FIG. 2) dimension of the buckle guide 46 at the bend inducing portion 58 is set so as to be shorter than at portions of the buckle guide 46 other than the bend inducing portion 58.

A wall portion 46B at another width direction side (the arrow D direction side in FIG. 2) of the buckle guide 46 bends so as to bulge out toward the vehicle rear side (to elaborate, diagonally toward the vehicle upper rear side) at the bend inducing portion 58. Moreover, a wall portion 46C and a wall portion 46D (the wall portion 46D of the buckle guide 46 is not illustrated in FIG. 2) on both thickness direction sides of the buckle guide 46 are cut out (notched) at the bend inducing portion 58 so as to follow the bend of the wall portion 46B on the another width direction side of the buckle guide 46. Thus, the inside of the bend inducing portion 58 opens diagonally toward the vehicle lower front side. When load from the another width direction side (the arrow D direction side in FIG. 2) of the buckle guide 46 is applied to a portion of the buckle guide 46 that is further toward the one length direction side than the bend inducing portion 58, the buckle guide 46 is mainly induced to undergo bending deformation at the bend inducing portion 58, and deformation of the buckle guide 46 at portions other than the bend inducing portion 58 is suppressed.

As illustrated in FIG. 4, a pair of restricting ribs 60 configuring a restricting section are provided at each wall portion 46C and 46D which are at thickness direction sides (the arrow E direction side and the arrow F direction side in FIG. 4) of the buckle guide 46. The pair of restricting ribs 60 of the wall portion 46C on one thickness direction side (the arrow E direction side in FIG. 4) of the buckle guide 46 are formed projecting out toward the one thickness direction side of the buckle guide 46 from an intermediate portion in the width direction of the buckle guide 46 at the wall portion 46C on the one thickness direction side of the buckle guide 46. One restricting rib 60 and the other restricting rib 60 of the wall portion 46C on the one thickness direction side of the buckle guide 46 face each other in the width direction of the buckle guide 46.

The pair of restricting ribs 60 of the wall portion 46D on another thickness direction side (the arrow F direction side in FIG. 4) of the buckle guide 46 are formed projecting out toward the another thickness direction side of the buckle guide 46 from an intermediate portion in the width direction of the buckle guide 46 at the wall portion 46D on the another thickness direction side of the buckle guide 46. One restricting rib 60 and the other restricting rib 60 of the wall portion 46D on the another thickness direction side of the buckle guide 46 face each other in the width direction of the buckle guide 46.

As illustrated in FIG. 2, the length direction of the restricting ribs 60 runs along the length direction (the arrow A direction and the arrow B direction in FIG. 2) of the buckle guide 46. The restricting ribs 60 are formed at portions further toward the one length direction side (the arrow A direction side in FIG. 2) of the buckle guide 46 than the bend inducing portion 58 of the buckle guide 46. Thus, the portion of the buckle guide 46 that is further toward the one length direction side of the buckle guide 46 than the bend inducing portion 58 has a greater bending rigidity with respect to load from the width direction side of the buckle guide 46 than the bend inducing portion 58.

As illustrated in FIG. 4, restricting grooves 62, which configure the restricting section together with the restricting ribs 60 of the buckle guide 46, are respectively provided in wall portions 34B and 34C which are at both thickness direction sides (the arrow E direction side and the arrow F direction side in FIG. 4) of the buckle cover 34. The restricting groove 62 of the wall portion 34B on the one thickness direction side (the arrow E direction side in FIG. 4) of the buckle cover 34 is formed in an intermediate portion in the width direction of the buckle cover 34 at an inner face of the wall portion 34B on the one thickness direction side of the buckle cover 34. The pair of restricting ribs 60 of the wall portion 46C on the one thickness direction side of the buckle guide 46 enter the restricting groove 62 of the wall portion 34B on the one thickness direction side of the buckle cover 34.

Of the pair of restricting ribs 60 of the wall portion 46C on the one thickness direction side of the buckle guide 46, one width direction side face 60A of the restricting rib 60 on the one width direction side (the arrow C direction side in FIG. 4) of the buckle guide 46 abuts one width direction side face 62A of the restricting groove 62 of the wall portion 34B on the one thickness direction side of the buckle cover 34. Of the pair of restricting ribs 60 of the wall portion 46C on the one thickness direction side of the buckle guide 46, another width direction side face 60B of the restricting rib 60 on the another width direction side of the buckle guide 46 abuts another width direction side face 62B of the restricting groove 62 of the wall portion 34B on the one thickness direction side of the buckle cover 34.

The restricting groove 62 of the wall portion 34C on the another thickness direction side (the arrow F direction side in FIG. 4) of the buckle cover 34 is formed in an intermediate portion in the width direction of the buckle cover 34 at an inner face of the wall portion 34C on the another thickness direction side of the buckle cover 34. The pair of restricting ribs 60 of the wall portion 46D on the another thickness direction side of the buckle guide 46 enter the restricting groove 62 of the wall portion 34C on the another thickness direction side of the buckle cover 34.

Of the pair of restricting ribs 60 of the wall portion 46D on the another thickness direction side of the buckle guide 46, one width direction side face 60A of the restricting rib 60 on the one width direction side of the buckle guide 46 abuts one width direction side face 62A of the restricting groove 62 of the wall portion 34C on the another thickness direction side of the buckle cover 34. Of the pair of restricting ribs 60 of the wall portion 46D on the another thickness direction side of the buckle guide 46, another width direction side face 60B of the restricting rib 60 on the another width direction side of the buckle guide 46 abuts another width direction side face 62B of the restricting groove 62 of the wall portion 34C on the another thickness direction side of the buckle cover 34.

Thus, the one width direction side faces 62A and the another width direction side faces 62B of the restricting grooves 62 of the buckle cover 34 are abutted by the respective restricting ribs 60 of the buckle guide 46. Relative displacement of the buckle cover 34 in the width direction with respect to the buckle guide 46 is thereby restricted. Moreover, the restricting ribs 60 of the buckle guide 46 abut bottom faces 62C (side faces of the restricting grooves 62 in the thickness directions of the buckle cover 34) of the restricting grooves 62 of the buckle cover 34, such that relative displacement of the buckle cover 34 in the thickness direction (the arrow E direction and the arrow F direction in FIG. 4) with respect to the buckle guide 46 is also restricted.

The length direction of the restricting grooves 62 of the buckle cover 34 runs along the length direction of the buckle cover 34, and the restricting grooves 62 are open at end faces that are diagonally toward the vehicle lower rear side of the buckle cover 34. Thus, the restricting ribs 60 of the buckle guide 46 are capable of sliding along the length direction of the restricting grooves 62 relative to the buckle cover 34, inside the restricting grooves 62 of the buckle cover 34.

Operation and Advantageous Effects of Present Exemplary Embodiment

In the buckle device 10, when a vehicle door corresponding to the seat 14 applied with the buckle device 10 is changed from a closed state to an open state, for example, this change in the open and closed states of the door is detected by a detector such as a door opening and closing detector such as a courtesy switch. When an occupant 64 sits on the seat 14, for example, this seating of the occupant 64 on the seat 14 is detected by a detector such as an occupant detector such as a load sensor provided at the seat 14 or the like. The level of electrical signals output from the detector to the controller is changed by the changes in the states of the door and the seat 14 accompanying an occupant boarding the vehicle in this manner. When the motor of the motor actuator 22 is accordingly driven to rotate the drive screw 20, the slider 24 is guided by the guide walls 18 of the frame 16 and slides toward the vehicle rear side. When the wire ropes 26 are accordingly moved toward their length direction leading end side, the buckle body 38 is pressed diagonally toward the vehicle upper front side by the wire ropes 26.

When pressing force from the wire ropes 26 is transmitted to the buckle cover 34 through the buckle body 38, then, as illustrated in FIG. 2, the buckle cover 34 is guided by the restricting ribs 60 of the buckle guide 46 and moved diagonally toward the vehicle upper front side (the arrow A direction side in FIG. 2). Due to the buckle cover 34 being moved in this manner, the occupant 64 can easily engage the tongue 44 with the buckle 36, and can easily put on the webbing 42.

When the tongue 44 engages with the buckle 36, the level of electrical signals output from the buckle switch of the buckle 36 to the controller changes. When the motor actuator 22 is accordingly driven to rotate the drive screw 20, the slider 24 is guided by the guide walls 18 of the frame 16 and slides toward the vehicle front side. When the wire ropes 26 are moved toward their length direction base end side accordingly, the buckle cover 34 is pulled by the wire ropes 26 through the buckle body 38. Thus, the buckle cover 34 is guided by the restricting ribs 60 of the buckle guide 46, and, as illustrated in FIG. 1, the buckle cover 34 is moved diagonally toward the vehicle lower rear side (the arrow B direction in FIG. 1).

Note that the restricting ribs 60 of the buckle guide 46 enter the restricting grooves 62 of the buckle cover 34, and displacement of the buckle cover 34 in the width direction of the buckle guide 46 with respect to the buckle guide 46 is restricted accordingly. This enables the space 56 to be secured between the wall portion 46A on the one width direction side of the buckle guide 46 and the wall portion 34A on the one width direction side of the buckle cover 34. This enables the curled cord 54 to be disposed along the buckle guide 46, even though the outer walls 52 are not provided at the portion of the buckle guide 46 that is further toward the one length direction side than the length direction intermediate portion thereof.

In this manner, the curled cord 54 can be disposed along the buckle guide 46, even though the outer walls 52 are not provided at the portion of the buckle guide 46 that is further toward the one length direction side than the length direction intermediate portion thereof. Thus, in a lowered state of the buckle 36 and the buckle cover 34 (the state illustrated in FIG. 1), even if a part of the buckle cover 34 or a member retained by the buckle cover 34 at the inside of the buckle cover 34 (such as a retain member for retaining the length direction leading end side of the curled cord 54 at the buckle cover 34) is disposed near to the one length direction side end portion of the buckle guide 46, the part of the buckle cover 34 or the member retained by the buckle cover 34 at the inside of the buckle cover 34 can be prevented or suppressed from abutting the outer walls 52 of the buckle guide 46.

Moreover, the buckle cover 34 is restricted from being displaced in the width direction and the thickness direction with respect to the buckle guide 46 due to the restricting ribs 60 of the buckle guide 46 abutting the one width direction side faces 62A and the another width direction side faces 62B of the restricting grooves 62, and the bottom faces 62C (the faces of the restricting grooves 62 in the thickness direction of the buckle cover 34) of the restricting grooves 62, of the buckle cover 34. Thus, for example, in a raised state (the state illustrated in FIG. 2) in which the buckle cover 34 has moved diagonally toward the vehicle upper front side (the arrow A direction in FIG. 2) with respect to the buckle guide 46, the buckle cover 34 can be suppressed or prevented from tipping over (slanting) in the width direction and the thickness direction, enabling the self-supporting (standing) performance of the buckle cover 34 in the raised state to be improved.

When the buckle cover 34 receives load from the vehicle upper side, the one width direction side faces 60A of the restricting ribs 60 of the buckle guide 46 are pressed diagonally toward the vehicle lower front side by the one width direction side faces 62A of the restricting grooves 62 of the buckle cover 34. Note that the length direction of the restricting ribs 60 of the buckle guide 46 runs along the length direction of the buckle guide 46. Thus, the portion of the buckle guide 46 where the restricting ribs 60 are formed and that is further toward the one length direction side (the arrow A direction side portion in FIG. 2) than the bend inducing portion 58 has a high bending rigidity.

In contrast thereto, the width direction dimension of the buckle guide 46 at the bend inducing portion 58 of the buckle guide 46 is smaller than the width direction dimension of the buckle guide 46 at portions other than the bend inducing portion 58, and the inside of the bend inducing portion 58 is open at the another width direction side (the arrow D direction side in FIG. 2) of the buckle guide 46. Thus, when load is applied to the portion of the buckle guide 46 further toward the one length direction side than the bend inducing portion 58 from the one width direction side (the arrow C direction side in FIG. 2) of the buckle guide 46, the buckle guide 46 is induced to undergo bending deformation at the bend inducing portion 58.

Thus, when the one width direction side faces 60A of the restricting ribs 60 of the buckle guide 46 are pressed diagonally toward the vehicle lower front side by the one width direction side faces 62A of the restricting grooves 62 of the buckle cover 34 due to the buckle cover 34 receiving load from the vehicle upper side, the buckle guide 46 mainly undergoes bending deformation at the bend inducing portion 58, bending deformation of the portion of the buckle guide 46 further toward the one length direction side than the bend inducing portion 58 is suppressed, and the portion of the buckle guide 46 further toward the one length direction side than the bend inducing portion 58 is turned and tilted.

This enables bending to be prevented or suppressed from occurring at the restricting ribs 60 of the buckle guide 46, even when load is applied to the buckle cover 34 from the vehicle upper side and the buckle guide 46 is bent. This enables the restricting ribs 60 of the buckle guide 46 to be prevented or suppressed from coming out of the restricting grooves 62 of the buckle cover 34 due to the restricting ribs 60 of the buckle guide 46 bending.

When the buckle cover 34 is moved along the length direction of the buckle cover 34 and the buckle guide 46 with respect to the buckle guide 46, the length direction leading end portion of the curled cord 54 is moved together with the buckle cover 34, and the curled cord 54 extends or contracts accordingly. Namely, the curled cord 54 extends or contracts according to a positional relationship of the buckle cover 34 relative to the buckle guide 46 along the length direction. This enables the curled cord 54 to be suppressed from becoming flexure (deflection), regardless of the positional relationship of the buckle cover 34 relative to the buckle guide 46 along the length direction. This accordingly enables the curled cord 54 to be suppressed from being abutted by other members, for example, enables the curled cord 54 to be suppressed from being abutted by the wire ropes 26 at further toward the vehicle diagonal upper front side than the buckle guide 46.

Note that the present exemplary embodiment is configured such that the restricting ribs 60 are provided to the buckle guide 46 and the restricting grooves 62 are provided to the buckle cover 34. However, configuration may be such that the restricting grooves 62 are provided to the buckle guide 46 and the restricting ribs 60 are provided to the buckle cover 34.

The present exemplary embodiment is configured such that a pair of (two) restricting ribs 60 are formed to the wall portions 46C and 46D on thickness direction sides of the buckle guide 46. However, the number of restricting ribs 60 formed to each wall portion 46C and 46D may be one, or may be three or more, and the number of restricting ribs 60 formed on the wall portion 46C may differ from the number of restricting ribs 60 formed on the wall portion 46D.

The present exemplary embodiment is configured such that the restricting ribs 60 of the buckle guide 46 are formed continuously along the length direction of the buckle guide 46; however, configuration may be such that the restricting ribs 60 of the buckle guide 46 are formed intermittently along the length direction of the buckle guide 46.

The present exemplary embodiment is configured such that the space 56 is formed between the wall portion 46A on the one width direction side of the buckle guide 46 and the wall portion 34A on the one width direction side of the buckle cover 34. However, for example, a space may be formed between the wall portion 46C on the one thickness direction side of the buckle guide 46 and the wall portion 34B on the one thickness direction side of the buckle cover 34. Namely, there is no particular limitation to the formation position of space as long as the space is formed between the buckle 36 and the buckle guide 46.

In the present exemplary embodiment, the restricting section is configured by the restricting ribs 60 provided at the buckle guide 46 and the restricting grooves 62 provided at the buckle cover 34. However, the restricting section is not limited to this kind of configuration. For example, a configuration may be applied in which restricting ribs, serving as a restricting section, formed projecting out from the wall portions 34A and 34C on both width direction sides of the buckle cover 34 toward the vehicle width direction inside of the buckle cover 34, are made to abut the wall portion 46A on the one width direction side of the buckle guide 46, such that displacement of the buckle guide 46 in the one width direction side is suppressed and the space 56 is secured. Any configuration may be applied as long as the restricting section is capable of restricting relative displacement of the buckle cover 34 in the width direction and the thickness direction with respect to the buckle guide 46.

For example, a configuration can be applied in which the restricting section is configured such that: a first abut portion (engage portion) provided at one of the buckle guide 46 or the buckle cover 34 (the restricting ribs 60 in the present exemplary embodiment) and a second abut portion (engage portion) provided at the other of the buckle guide 46 or the buckle cover 34 (the restricting grooves 62 in the present exemplary embodiment) abut so as to secure the space 56 such that a wall portion (the wall portion 46A in the present exemplary embodiment) of the buckle guide 46 and a wall portion (the wall portion 34A in the present exemplary embodiment) of the buckle cover 34, forming the space 56 therebetween, do not relatively move in a direction in which the space 56 becomes small or narrow (in facing direction of the wall portion of the buckle guide 46 and the wall portion of the buckle cover 34) (the arrow C direction and the arrow D direction in the present exemplary embodiment).

Further, for example, a configuration can be applied in which the restricting section is configured such that: a first abut face of the first abut portion (the one width direction side face 60A in the present exemplary embodiment) and a second abut face of the second abut portion (the one width direction side face 62A in the present exemplary embodiment) abut in a direction substantially along the facing direction of the wall portion of the buckle guide 46 and the wall portion of the buckle cover 34.

The present exemplary embodiment is configured such that the outer walls 52 are provided to the buckle guide 46; however, a configuration may be applied in which the outer walls 52 are not provided.

In the present exemplary embodiment, the moving member provided between both outer walls 52 of the buckle guide 46 and in the space 56 is the curled cord 54; however, the moving member may be a straight, cord shaped cable, and any configuration may be applied as long as at least part of the moving member is moved together with the buckle cover 34. To elaborate, a configuration may be applied in which a member other than the moving member is provided between both outer walls 52 of the buckle guide 46 and in the space 56.

The present exemplary embodiment is configured such that the buckle cover 34 is moved together with the buckle 36 by drive force of the motor of the motor actuator 22; however, configuration may be such that the occupant 64 moves the buckle cover 34 manually.

The present exemplary embodiment is configured such that the buckle cover 34 serving as an outer side member is moved together with the buckle 36. However, configuration may be such that an inner side member provided at the inside of an outer side member fixed to the frame 16 or the like is capable of moving, and the buckle 36 is provided at the inner side member.

In the present exemplary embodiment, an outer face (a face on the arrow C direction side in FIG. 2) of the wall portion 46A of the buckle guide 46 is a planar face that is substantially uniform in the length direction (the arrow A direction and the arrow B direction in FIG. 2) of the buckle guide 46, the width direction (the arrow C direction and the arrow D direction in FIG. 2) of the buckle guide 46, and the thickness direction (the arrow E direction and the arrow F direction in FIG. 4) of the buckle 36. However, for example, the outer face of the wall portion 46A of the buckle guide 46 at an end portion on the one length direction side (the arrow A direction side in FIG. 2) of the buckle guide 46 may be a sloped face or a bent (curved) face that is displaced toward the another width direction side (the arrow D direction side in FIG. 2) of the buckle guide 46 on progression toward the one length direction side of the buckle guide 46. In such a configuration, the curled cord 54 can be suppressed from catching on the one length direction side end of the buckle guide 46 when the curled cord 54 contracts accompanying movement of the buckle cover 34 diagonally toward the vehicle lower rear side (the arrow B direction side in FIG. 1).

What is claimed is:
1. A buckle device comprising:
 a buckle that is configured to engage with a tongue of a seatbelt device;
 an extending and contracting member in which an inner side member is provided at inside of a tube shaped outer side member, the buckle being provided at one of the outer side member or the inner side member, the extending and contracting member being extended and contracted due to the one of the outer side member or the inner side member being moved with respect to another of the outer side member or the inner side member; and a restricting section that restricts relative displacement of the inner side member with respect to the outer side member in a direction in which a space between the inner side member and the outer side member becomes smaller, and further comprising:

a bend inducing portion that is provided at the other of the outer side member or the inner side member, and that induces bending deformation of the other of the outer side member or the inner side member due to the other of the outer side member or the inner side member receiving load in a direction intersecting a movement direction of the one of the outer side member or the inner side member, wherein rigidity, with respect to the load, of a portion of the other of the outer side member or the inner side member, the portion being further toward a buckle side than the bend inducing portion, is enhanced by the restricting section.

2. The buckle device of claim 1, wherein the restricting section guides the one of the outer side member or the inner side member in a movement direction of the one of the outer side member or the inner side member.

3. The buckle device of claim 1, further comprising a moving member that is disposed inside the space, that is connected to the buckle or to the one of the outer side member or the inner side member, and that has at least a portion that is moved together with the buckle or the one of the outer side member or the inner side member.

4. The buckle device of claim 2, further comprising a moving member that is disposed inside the space, that is connected to the buckle or to the one of the outer side member or the inner side member, and that has at least a portion that is moved together with the buckle or the one of the outer side member or the inner side member.

5. The buckle device of claim 4, further comprising:
a coupling member that has one side coupled to the buckle or to the one of the outer side member or the inner side member; and
a driving section to which another side of the coupling member is coupled, that moves the coupling member by outputting drive force, and that moves, together with the coupling member, the one of the outer side member or the inner side member with respect to the other of the outer side member or the inner side member,
wherein the moving member is configured to extend and contract toward a movement direction side of the one of the outer side member or the inner side member due to movement of the one of the outer side member or the inner side member.

6. The buckle device of claim 3, further comprising:
a coupling member that has one side coupled to the buckle or to the one of the outer side member or the inner side member; and
a driving section to which another side of the coupling member is coupled, that moves the coupling member by outputting drive force, and that moves, together with the coupling member, the one of the outer side member or the inner side member with respect to the other of the outer side member or the inner side member,
wherein the moving member is configured to extend and contract toward a movement direction side of the one of the outer side member or the inner side member due to movement of the one of the outer side member or the inner side member.

7. The buckle device of claim 3, wherein:
the restricting section is provided at at least the another of the outer side member or the inner side member, the restricting section restricting relative displacement of the inner side member with respect to the outer side member in the direction in which the space between the inner side member and the outer side member becomes smaller by being abutted to the one of the outer side member or the inner side member; and
the restricting section guides the one of the outer side member or the inner side member in a movement direction of the one of the outer side member or the inner side member.

8. The buckle device of claim 7,
wherein the restricting section includes a restricting groove formed at the one of the outer side member or the inner side member,
the restricting section of the another of the outer side member or the inner side member enters inside the restricting groove, by the restricting section of the another of the outer side member or the inner side member abutting the restricting groove, relative displacement of the one of the outer side member or the inner side member with respect to the another of the outer side member or the inner side member is restricted in a direction intersecting a moving direction of the one of the outer side member or the inner side member with respect to the another of the outer side member or the inner side member, and
due to the restricting section of the another of the outer side member or the inner side member, which enters the inside, the one of the outer side member or the inner side member is guided in the moving direction of the one of the outer side member or the inner side member with respect to the another of the outer side member or the inner side member.

9. The buckle device of claim 1, wherein:
the restricting section is provided at at least the another of the outer side member or the inner side member, the restricting section restricting relative displacement of the inner side member with respect to the outer side member in the direction in which the space between the inner side member and the outer side member becomes smaller by being abutted to the one of the outer side member or the inner side member; and
the restricting section guides the one of the outer side member or the inner side member in a movement direction of the one of the outer side member or the inner side member.

10. The buckle device of claim 9, wherein the restricting section enhances rigidity of the another of the outer side member or the inner side member.

11. The buckle device of claim 9,
wherein the restricting section includes a restricting groove formed at the one of the outer side member or the inner side member,
the restricting section of the another of the outer side member or the inner side member enters inside the restricting groove, by the restricting section of the another of the outer side member or the inner side member abutting the restricting groove, relative displacement of the one of the outer side member or the inner side member with respect to the another of the outer side member or the inner side member is restricted in a direction intersecting a moving direction of the one of the outer side member or the inner side member with respect to the another of the outer side member or the inner side member, and due to the restricting section of the another of the outer side member or the inner side member, which enters the inside, the one of the outer side member or the inner side member is guided in the moving direction of the one of the outer side member or the inner side member with respect to the another of the outer side member or the inner side member.

12. A buckle device comprising:

a buckle that is configured to engage with a tongue of a seatbelt device;

an extending and contracting member in which an inner side member is provided at inside of a tube shaped outer side member, the buckle being provided at one of the outer side member or the inner side member, the extending and contracting member being extended and contracted due to the one of the outer side member or the inner side member being moved with respect to another of the outer side member or the inner side member; and a restricting section that restricts relative displacement of the inner side member with respect to the outer side member in a direction in which a space between the inner side member and the outer side member becomes smaller, wherein the restricting section is provided at at least the another of the outer side member or the inner side member, the restricting section restricting relative displacement of the inner side member with respect to the outer side member in the direction in which the space between the inner side member and the outer side member becomes smaller by being abutted to the one of the outer side member or the inner side member;

the restricting section guides the one of the outer side member or the inner side member in a movement direction of the one of the outer side member or the inner side member, the restricting section includes a restricting groove formed at the one of the outer side member or the inner side member, the restricting section of the another of the outer side member or the inner side member enters inside the restricting groove, by the restricting section of the another of the outer side member or the inner side member abutting the restricting groove, relative displacement of the one of the outer side member or the inner side member with respect to the another of the outer side member or the inner side member is restricted in a direction intersecting a moving direction of the one of the outer side member or the inner side member with respect to the another of the outer side member or the inner side member, and due to the restricting section of the another of the outer side member or the inner side member, which enters the inside, the one of the outer side member or the inner side member is guided in the moving direction of the one of the outer side member or the inner side member with respect to the another of the outer side member or the inner side member.

13. A buckle device comprising:

a buckle that is configured to engage with a tongue of a seatbelt device;

an extending and contracting member in which an inner side member is provided at inside of a tube shaped outer side member, the buckle being provided at one of the outer side member or the inner side member, the extending and contracting member being extended and contracted due to the one of the outer side member or the inner side member being moved with respect to another of the outer side member or the inner side member; and a restricting section that restricts relative displacement of the inner side member with respect to the outer side member in a direction in which a space between the inner side member and the outer side member becomes smaller, and further comprising:

a moving member that is disposed inside the space, that is connected to the buckle or to the one of the outer side member or the inner side member, and that has at least a portion that is moved together with the buckle or the one of the outer side member or the inner side member;

wherein the restricting section is provided at at least the another of the outer side member or the inner side member, the restricting section restricting relative displacement of the inner side member with respect to the outer side member in the direction in which the space between the inner side member and the outer side member becomes smaller by being abutted to the one of the outer side member or the inner side member;

the restricting section guides the one of the outer side member or the inner side member in a movement direction of the one of the outer side member or the inner side member, and wherein the restricting section includes a restricting groove formed at the one of the outer side member or the inner side member, the restricting section of the another of the outer side member or the inner side member enters inside the restricting groove, by the restricting section of the another of the outer side member or the inner side member abutting the restricting groove, relative displacement of the one of the outer side member or the inner side member with respect to the another of the outer side member or the inner side member is restricted in a direction intersecting a moving direction of the one of the outer side member or the inner side member with respect to the another of the outer side member or the inner side member, and due to the restricting section of the another of the outer side member or the inner side member, which enters the inside, the one of the outer side member or the inner side member is guided in the moving direction of the one of the outer side member or the inner side member with respect to the another of the outer side member or the inner side member.

* * * * *